Dec. 15, 1964   P. B. KAPP   3,160,936
SNAP-FASTENER DEVICE
Filed June 23, 1961   2 Sheets-Sheet 1
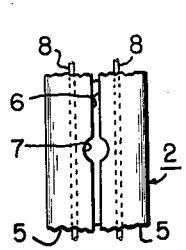
Fig. 1
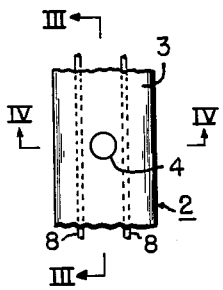
Fig. 2
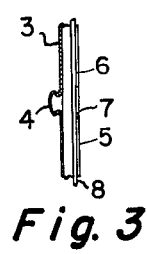
Fig. 3
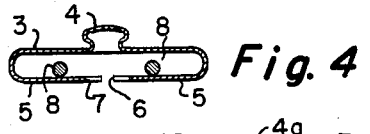
Fig. 4
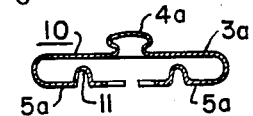
Fig. 5
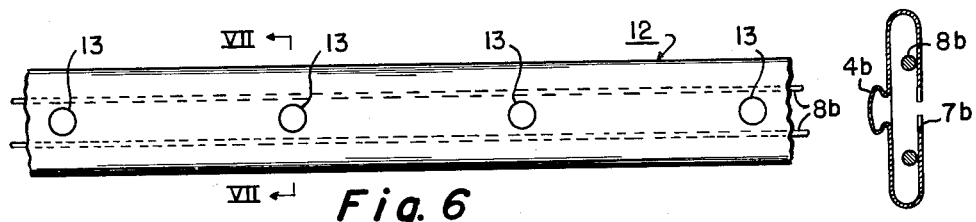
Fig. 6
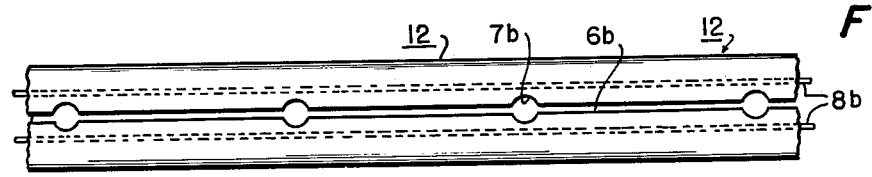
Fig. 7
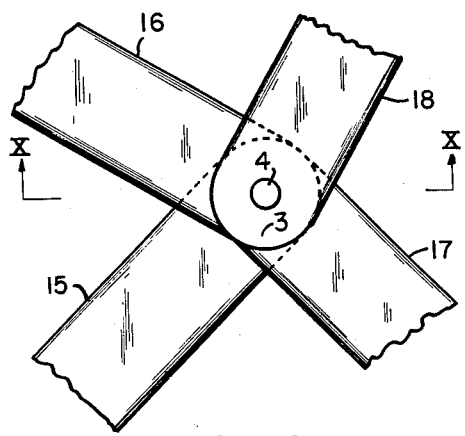
Fig. 8
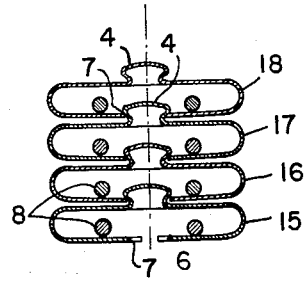
Fig. 9
Fig. 10
INVENTOR.
Paul B. Kapp
BY
HIS ATTORNEYS Dec. 15, 1964   P. B. KAPP   3,160,936
SNAP-FASTENER DEVICE
Filed June 23, 1961   2 Sheets-Sheet 2
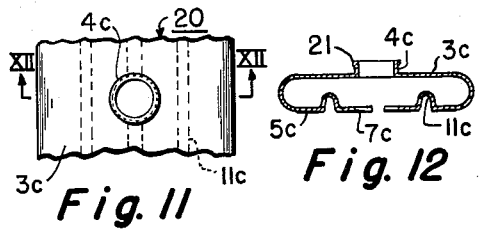
Fig. 11
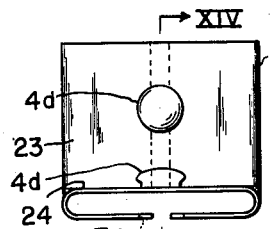
Fig. 12
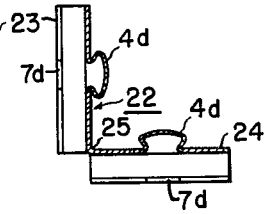
Fig. 13
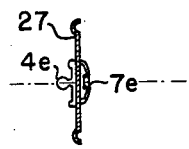
Fig. 14
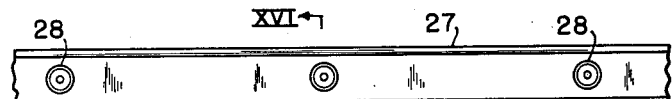
Fig. 15
Fig. 16
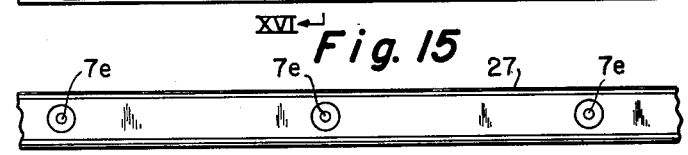
Fig. 17
Fig. 18
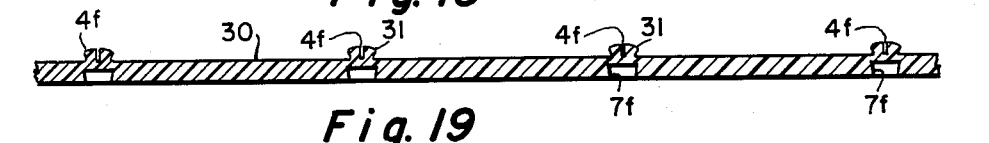
Fig. 19
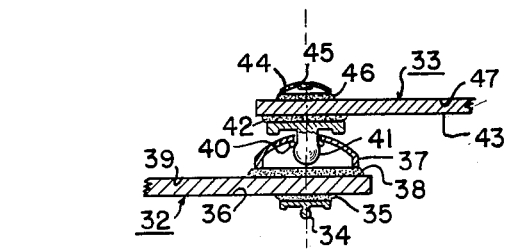
Fig. 20
INVENTOR.
Paul B. Kapp
BY
HIS ATTORNEYS United States Patent Office 3,160,936
Patented Dec. 15, 1964

3,160,936
SNAP-FASTENER DEVICE
Paul B. Kapp, 512 W. Nittany Ave., State College, Pa.
Filed June 23, 1961, Ser. No. 119,214
6 Claims. (Cl. 24—208)

This invention relates to snap-fastener devices. It is described as applied more particularly to an Erector set member but may be used wherever it is desired to fasten two or more members together. In the prior known Erector sets, the structural members are fastened together by bolts and nuts which are likely to be lost, and moreover require tools for their application, as well as an assortment of bolt lengths according to the number of pieces to be assembled at any single joint. Also these nuts and bolts, if used by small children, may be accidentally swallowed. In accordance with the present invention, each member has integral with it, a male snap-fastener element and a female snap-fastener element, the two snap-fastener elements being located in or on the same member so that two or more members can be fastened together to form a joint by merely snapping the snap-fastener element together. Among several embodiments of the invention may be included (1) locating at least one male and at least one female element on opposite sides or faces, and (2) locating such elements on opposite sides in axial alignment.

The members can be separated from each other readily without the use of tools to disassemble the members. Any number of members can be fastened together to form a joint, the complete set of members comprising only the members having integral therewith the male and female snap-fastener elements, there being no loose parts which might get lost or which may be difficult to use in connecting the members together.

The members which are to be connected together may be made of metal, wood, plastic or any other suitable material or combinations of several materials. The members may be in the form of a single thickness, substantially flat strip, or in various other forms as for example an angle.

In the accompanying drawings which illustrate several embodiments of the invention:

FIGURES 1, 2, 3 and 4 are, respectively, a bottom plan view (female side), a top plan view (male side), a section taken on the line III—III of FIGURE 2, and a section taken on the line IV—IV of FIGURE 2, of one embodiment of the invention, FIGURE 4 being on an enlarged scale;

FIGURE 5 is a section similar to the section shown in FIGURE 4, but of a modified form of the member;

FIGURES 6, 7 and 8 are, respectively, a top plan view (male side), a section on an enlarged scale taken on the line VII—VII of FIGURE 6, and a bottom plan view (female side) of another embodiment;

FIGURE 9 is a plan view and FIGURE 10 is a section taken on the line X—X of FIGURE 9 but on an enlarged scale, illustrating a joint formed by four structural members, the male and female snap-fastener elements being of the general type shown in FIGURES 1–4;

FIGURES 11 and 12 are, respectively, a top plan view (male side) and a section taken on the line XII—XII of FIGURE 11, illustrating another embodiment;

FIGURES 13 and 14 are, respectively, a front view and a section taken on the line XIV—XIV of FIGURE 13 in which the structural member is in the form of an angle;

FIGURES 15, 16 and 17 are, respectively, a top plan view (male side), a section on an enlarged scale taken on the line XVI—XVI of FIGURE 15, and a bottom plan view (female side) of another embodiment of the invention;

FIGURES 18 and 19 are, respectively, a top plan view (male side) and a section taken along the line XIX—XIX of FIGURE 18 of another embodiment of the invention in which the member is made of molded plastic; and FIGURE 20 is a section through two structural members, each having a male snap-fastener element and a female snap-fastener element, in which the male and female snap-fastener elements are of different sizes.

Referring now more particularly to the accompanying drawings, and, for the present, to FIGURES 1–4, the structural member generally designated by reference numeral 2 is made of light gauge steel of suitable strength properties. It comprises a top portion 3 having a button 4 extending upwardly above the top portion 3, the button 4 constituting the male snap-fastener element. At the side edges of the top portion 3, the member is bent downwardly and inwardly to form two inturned flanges 5 which are located below and spaced from the top portion 3. The adjacent edges of these flanges are spaced from each other to form a slot 6 and the edges of the inturned flanges are shaped to form a cut-out hole 7, this hole being of a size to receive a button 4 integral with another structural member 2 and to form a snap-fastener joint connecting two of the members 2. In other words, the hole 7 which forms the female snap-fastener element is of substantially the same size as the male snap-fastener element 4. The male snap-fastener element 4 and the female snap-fastener element 7 are located on opposite sides of the member 2 and in axial alignment with each other. Two stiffening wires 8 extend longitudinally of the member 2 and are welded or otherwise securely attached to the inner surfaces of the flanges 5. These wires should be sufficiently large in section to substantially reduce the free movement of the flanges 5 and may be practically equal in thickness to the distance between the top portion 3 and flange 5. The use of these stiffening wires is optional particularly where the material of which the member 2 is made has the desirable spring characteristics.

FIGURE 5 illustrates an embodiment in which the structural member 10 is similar to the structural member 2 shown in FIGURES 1–4, except that instead of employing the stiffening wires 8, the flanges 5a are crimped as indicated by reference numeral 11. The depth of the crimp should be selected to limit the free movement of flange 5a and may approximate the clear distance between flange 5a and top portion 3a.

Referring to the embodiment shown in FIGURES 6, 7 and 8, the structural member indicated generally by reference numeral 12 is relatively long as compared with the structural member 2 shown in FIGURES 1–4, and is provided with four snap-fastener devices 13, each comprising a button 4b forming the male snap-fastener element and a hole 7b forming the female snap-fastener element. Stiffening wires 8 are employed.

FIGURES 9 and 10 illustrate a joint formed of four structural members 15, 16, 17 and 18, each of these structural members being the same as the structural member 2 shown in FIGURES 1–4. As shown in FIGURES 9 and 10, the lowest placed structural member is designated by reference numeral 15, the next highest by reference numeral 16, the next highest by reference numeral 17, and the top one by reference numeral 18. The hole 7 forming the female snap-fastener element of the top member 18 receives the button 4 of the member 17; the members 15 and 16 are arranged in a similar manner.

Any number of structural members can be connected to form a joint in the manner illustrated in FIGURES 9 and 10.

Referring to FIGURES 11 and 12, the structural member 20 is similar to the structural member 10 shown in FIGURE 5, except that instead of employing a button 4a as the male snap-fastener element, a collar 4c having an outwardly-turned upper edge portion 21 is used. This collar 4c may be made by upsetting a part of the upper portion 3c of the member 20. The flanges 5c are provided with one or more holes 7c which form the female snap-fastener element and receive the collar 4c of another structural member 20 to form a snap-fastener joint. Crimps 11c are provided in the flanges 5c.

In the embodiment illustrated in FIGURES 13 and 14, the structural member 22 is in the form of an angle having a vertical part 23 and a horizontal part 24, connected by a bend 25. Each of the parts 23 and 24 is provided with a button 4d and a hole 7d forming, respectively, a male snap-fastener element and a female snap-fastener element.

Referring to FIGURES 15, 16 and 17, the structural member designated generally by reference numeral 27 is provided with three snap-fastener devices 28. Each snap-fastener device 28 comprises a male snap-fastener element 4e spot welded to one side of the member 27 and a female snap-fastener element 7e spot welded to the opposite side of the member 27. The snap-fastener elements 4e and 7e are of the kind commonly used as dress snap-fasteners.

Referring to FIGURES 18 and 19, the structural member 30 is made of molded plastic or other suitable material. Four buttons 4f extend from the top surface of the member 30. Each of these buttons is slotted as indicated by reference numeral 31 to make the buttons more resilient. A keystone shaped depression 7f is formed in the lower surface of the member 30 in alignment with each of the buttons 4f. Each depression 7f forms a female snap-fastener element adapted to receive a button 4f on another structural member 30 to form a snap-fastener joint.

In each of the embodiments thus far described, each structural member, for example the structural member 2 shown in FIGURES 1-4, is provided with a male snap-fastener element 4 and a female snap-fastener element 7, adapted to cooperate with each other in joining two structural members 2 together, all of the male snap-fastener elements and all of the female snap-fastener elements on all of the members 2 being of the same size, any male snap-fastener element 4 being adapted to be received in any of the female snap-fastener elements 7 to form a snap-fastener joint. While this is the preferred construction since it makes all structural members interchangeable, it is not absolutely essential to the present invention. The same structural member may have a male snap-fastener element of one size and a female snap-fastener element of a different size. Such construction is illustrated in FIGURE 20 wherein two structural members 32 and 33 are joined together by a snap-fastener joint. A male snap-fastener element 34 is welded as indicated by reference numeral 35 to the lower surface 36 of the structural member 32. A female snap-fastener element 37 is welded as indicated by reference numeral 38 to the upper surface 39 of the structural member 32. The female snap-fastener element 37 has a recess 40 which is of a larger diameter than that required to receive the male snap-fastener element 34, but is of a diameter to receive in snap-fastening relationship a male snap-fastener element 41 secured by welding 42 to the under-surface 43 of the structural member 33. A female snap-fastener element 44 provided with a recess 45 is secured by welding 46 to the upper surface 47 of the structural member 33. The recess 45 is of a size to receive in snap-fastening relationship, a male snap-fastener element of the same size as the male snap-fastener element 34. Whereas welding is noted herein as a method of attachment of various elements, any other suitable procedure may be employed such as brazing, soldering, etc.

Where, as in the embodiment shown in FIGURE 20, not all of the male and female snap-fastener elements are of corresponding sizes, it is necessary in forming a joint to select those structural members having correspondingly sized male and female snap-fastener elements.

The members to be connected together need not be rigid. The present invention could be used for connecting together two or more pieces of cloth or other flexible material, each piece of cloth being provided with both a male snap-fastener element and a female snap-fastener element in the relationship hereinabove described.

The invention is not limited to the preferred embodiment, but may be otherwise embodied or practiced within the scope of the following claims.

I claim:

1. A snap-fastener member formed from a single piece of resilient material and comprising a top portion, a male snap-fastener element projecting upwardly above said top portion and integral therewith, two inturned flanges connected to and located below and spaced from said top portion, said inturned flanges being shaped to form a female snap-fastener element on the opposite side of said member, and spacing means located between said top portion and said inturned flanges and extending substantially completely between said top portion and each of said flanges to limit movement of said flanges toward said top portion.

2. A snap-fastener member according to claim 1, wherein said spacing means comprises longitudinally extending wires secured to said inturned flanges.

3. A snap-fastener member according to claim 1, wherein said spacing means comprises ribs formed in said inturned flanges.

4. A snap-fastener device comprising an elongated member having a continuous top portion, at least one male snap-fastener element located on the longitudinal axis of and projecting upwardly above said top portion and integrally formed therewith, said male snap-fastener element having an outwardly flaring portion adjacent its upper end, and two resilient inturned flanges located below and spaced from said top portion, the edges of said inturned flanges being spaced apart to form a continuous throat extending throughout the length of said member, said throat having at least one enlarged portion shaped to form a female snap-fastener element in axial alignment with said male snap-fastener element and located on the opposite side of said member from said male element, and the area of said enlarged portion of said throat being slightly smaller than the maximum cross-sectional area of said outwardly flaring portion of said male element.

5. A snap-fastener device according to claim 4 wherein said male snap-fastener element has a circular lateral cross-section and said female snap-fastener element is circular so that pivotal movement may be had between a pair of devices connected by said snap-fastener elements.

6. A snap-fastener device comprising an elongated member having a continuous top portion, at least one male snap-fastener element located on the longitudinal axis of and projecting upwardly above said top portion and integrally formed therewith, said male snap-fastener element having an outwardly flaring portion adjacent its upper end, and two resilient inturned flages spaced from the lower surface of said top portion and substantially parallel to said top portion, the edges of said inturned flanges being spaced apart to form a continuous throat extending throughout the length of said member, said throat having at least one enlarged portion shaped to form a female snap-fastener element in axial alignment with said male snap-fastener element and located on the opposite side of said member from said male element, and the area of said enlarged portion of said throat being slightly smaller than the maximum cross-sectional area of said outwardly flaring portion of said male element.

References Cited by the Examiner

UNITED STATES PATENTS

| | | | |
|---|---|---|---|
| 930,961 | 8/09 | Hellwig | 24—216 |
| 1,223,641 | 4/17 | Taylor | 24—203 |
| 2,013,771 | 9/35 | Tompkins | 46—25 X |
| 2,173,020 | 9/39 | Kubach | 189—34 |
| 2,800,743 | 7/57 | Meehan et al. | 46—25 |
| 2,810,233 | 10/57 | Jakobsen | 46—28 |
| 2,943,415 | 7/60 | Viken | 46—28 |

FOREIGN PATENTS

| | | |
|---|---|---|
| 3,291 | 1909 | Great Britian. |
| 160,228 | 3/21 | Great Britain. |
| 506,204 | 5/39 | Great Britain. |

DONLEY J. STOCKING, *Primary Examiner.*

ABRAHAM G. STONE, *Examiner.*